(12) United States Patent
Gerets et al.

(10) Patent No.: US 7,938,543 B2
(45) Date of Patent: May 10, 2011

(54) COOLING OF REFLECTIVE SPATIAL LIGHT MODULATING DEVICES

(75) Inventors: Peter Gerets, Roeselare (BE); Krist Vandorpe, Beveren-Leie (BE); Winter Van Rafelgem, Aalbeke (BE)

(73) Assignee: Barco N.V., Kortrijk (BE)

( * ) Notice: Subject to any disclaimer, the term of this patent is extended or adjusted under 35 U.S.C. 154(b) by 873 days.

(21) Appl. No.: 11/806,543

(22) Filed: Jun. 1, 2007

(65) Prior Publication Data

US 2008/0024733 A1    Jan. 31, 2008

(30) Foreign Application Priority Data

Jun. 2, 2006 (EP) .................................. 06011480

(51) Int. Cl.
  *G03B 21/16* (2006.01)
(52) U.S. Cl. ............................................. 353/52
(58) Field of Classification Search ............... 250/208.1, 250/216, 226, 229, 550; 359/618, 634, 290–292, 359/820, 11; 353/31, 34, 37, 52, 119; 349/33, 349/72, 74, 147, 149; 361/687, 714
  See application file for complete search history.

(56) References Cited

U.S. PATENT DOCUMENTS

| 6,588,215 | B1 |  | 7/2003 | Ghoshal |
| 6,751,027 | B2 | * | 6/2004 | Van Den Bossche et al. ............. 359/634 |
| 6,804,967 | B2 |  | 10/2004 | Symko et al. |
| 2002/0163625 | A1 |  | 11/2002 | Tabuchi et al. |
| 2004/0169784 | A1 |  | 9/2004 | Miyashita et al. |
| 2005/0213227 | A1 |  | 9/2005 | Fujimori et al. |
| 2006/0001973 | A1 | * | 1/2006 | Peterson et al. ............. 359/618 |

FOREIGN PATENT DOCUMENTS

| EP | 1211545 | 6/2002 |
| EP | 1549057 | 6/2005 |
| EP | 1729525 | 12/2006 |
| EP | 1750441 | 2/2007 |

OTHER PUBLICATIONS

Search Report of European Patent Office regarding European Application No. EP07010948.3, Sep. 25, 2009.

* cited by examiner

*Primary Examiner* — Kevin Pyo
*Assistant Examiner* — Don Williams
(74) *Attorney, Agent, or Firm* — Bacon & Thomas, PLLC (57) ABSTRACT

An optical system as subject of the present invention comprises at least one packaged spatial light modulator comprising a front side for facing incident light. The optical system further comprises projection optics for projecting an image formed by the packaged spatial light modulator, there being a sealed gas space in between the front side of the packaged spatial light modulator. The optical system comprises a first heat transporting means being thermally coupled to the frontside of the packaged spatial light modulator, the first heat transporting means comprising a thermally conductive frame contacting the front side of the packaged spatial light modulator along an edge thereof. A second heat transporting means being thermally coupled to the package back side may be provided as well. The first and second heat transporting means are thermally separated by the package. The device may further comprise a control means for controlling the heat flow in at least one of the first heat transporting means and the second heat transporting means.

13 Claims, 5 Drawing Sheets

COOLING OF REFLECTIVE SPATIAL LIGHT MODULATING DEVICES

TECHNICAL FIELD OF THE INVENTION

The present invention relates to housings for reflective spatial light modulating devices and optical systems comprising such a housing as well as to projectors and methods of operating projectors.

BACKGROUND OF THE INVENTION

Image modulating systems, also known as light engines, comprising a housing including spatial light modulating devices or light valves are well known. A spatial light modulating housing may function either in a light transmissive mode, such as for LCD light modulators, or it may be a light reflective spatial light modulating device using DMD or LCD, e.g. LCOS, light modulators.

Image modulating systems comprising reflective spatial light modulating devices based on mirrors suffer less from heat generation than other schemes. However, heat is generated by both the electrical circuits and components, usually located at the back of the reflective spatial light modulating device, and also the incident light which can provide thermal energy in the form of light mainly to the front side of the spatial light modulating device. Some of the light is absorbed by the reflective spatial light modulating device on front side as well as some on back side and in the reflective elements.

Many attempts to dissipate or drain the heat way from a reflective spatial light modulating device have been made. As an example in U.S. Pat. No. 6,751,027B2, the heat is drained from the backside of the reflective spatial light modulating device by means of a thermally conductive stud. This stud contacts the backside of the reflective spatial light modulating device.

One possible alternative is to drain the heat away from the backside of a spatial light modulating device via a thermal path using thermal conductivity of several elements, whereas the front side of the device is provided with cooling air, to cool the front side using convective cooling. This however has the disadvantage that the air usually is contaminated with dust or smoke, which can be deposited on the optical surfaces and cause malfunctioning of the spatial light modulating device itself, or any optical elements located near the spatial light modulating device. Even more, as there is ideally very little space between the optical system, such as a prism system of the image modulating system and the spatial light modulating device, the air provided to the front side would not be able to flow easily over the front side to be cooled. This results in a low cooling efficiency.

SUMMARY OF THE INVENTION

It is an object of the present invention to provide a good optical system comprising a reflective spatial light modulating device, and/or a good projection device comprising such optical system.

It is an advantage of some optical systems in accordance with embodiments of the present invention that they can be cooled efficiently and accurately.

A further advantage of embodiments of the present invention is that, for reflective spatial light modulating devices, the temperature of both front side and backside can be controlled. In accordance with some embodiments, the temperature of both front side and backside of reflective spatial light modulating devices, and thus, optionally, the temperature differences over front and backside of the reflective spatial light modulating device, may be controlled jointly and/or independently one from the other. According to other embodiments, in case there are a plurality of reflective spatial light modulating devices, the temperature of frontside and/or backside of one reflective spatial light modulating device may be controlled independently from the temperature of frontside and/or backside of any other reflective spatial light modulating device in an optical system. In particular embodiments of the present invention, at least two reflective spatial light modulating devices are provided, each spatial light modulating device having two heat flow paths (one to the front and one to the backside), and these at least four heat flow paths are controllable all independently of one another.

It is an advantage of optical systems in accordance with some embodiments of the present invention that the temperature of front side of the reflective spatial light modulating device can be controlled independently from the image content, and substantially in function of the amount of incident light.

It is an advantage of optical systems in accordance with some embodiments of the present invention that the reflective spatial light modulating device allows sealing between reflective spatial light modulating device and projection optics, thereby reducing the risk of contamination, e.g. contamination of the reflective spatial light modulating device with dust, stage smoke, air pollution, etc. Further, the number of maintenance interventions can be reduced or eliminated.

It is an advantage of optical systems in accordance with some embodiments of the present invention that by cooling both back side and front side of the packaged spatial light modulator, the overall temperature of the package and the reflective spatial light modulating device can be decreased. Alternatively, a package as subject of the present invention being cooled at front and backside has the advantage that it can be subjected to a higher amount of incident light as compared to similar packages having only cooling at its backside or at its frontside.

The above objective is accomplished by an optical system comprising at least one packaged reflective spatial light modulating device according to the present invention, a method of construction of such a device and a method of operating such a device and a controller for such a device.

In a first aspect, the present invention provides an optical system comprising at least one packaged spatial light modulator comprising a front side for facing incident light, projection optics for projecting an image formed by the packaged spatial light modulator, a sealed gas space in between the front side of the packaged spatial light modulator and the projection optics, and heat transporting means being thermally coupled to the front side of the spatial light modulator, the first heat transporting means comprising a thermally conductive frame contacting the front side of the packaged spatial light modulator along an edge thereof.

The optical system may further comprise a first heat dissipating means. The first heat transporting means and/or the first heat dissipating means can optionally include a first heat exchanging means. The first heat transporting means is thermally coupled to the frontside of the package and/or to the frontside of the reflective spatial light modulating device itself.

In an optical system according to embodiments of the present invention, the at least one packaged spatial light modulator comprises a back side, and the optical system may furthermore comprise a second heat transporting means thermally coupled to the back side of the at least one packaged spatial light modulator. Optionally a second heat dissipating means may be provided. The second heat transporting means and/or the second heat dissipating means can optionally include a second heat exchanging means. The second heat transporting means is thermally coupled to the backside of the package and/or to the backside of the reflective spatial light modulating device.

Thus two heat paths may be provided, one from the back of the reflective spatial light modulating device to a sink (e.g. the first heat dissipating or first heat exchanging means) and another one from the front of the reflective spatial light modulating device to a sink (e.g. the second heat dissipating means or heat second exchanging means). Alternatively, the first and/or the second heat dissipating means or heat exchanging means can be applied directly to the front and/or back, respectively, of the spatial light modulator. The first and second heat transporting means can be thermally separated by the package and/or the reflective spatial light modulating device itself. Internal or external to the housing, a control means can be provided for controlling the heat flow in at least one or both of the first heat transporting means (or to the first heat dissipating or heat exchanging means) and the second heat transporting means (or to the second heat dissipating or heat exchanging means). The control of the one or two heat paths can be done independently from the heat flows, e.g. in the first and second heat transporting means, or may be controlled in unison or in combination, e.g. by using a feedback loop or loops from a sensor or sensors sensing a temperature of the reflective spatial light modulating device, e.g. on the front and/or the back.

The package can thermally separate the first and second heat transporting means. Usually, the spatial light modulator has a poor thermal conductivity.

In embodiments of the present invention, the optical system is provided with two thermal paths, a first thermal path coupling the frontside of the package from the reflective spatial light modulating device to a heat dissipating means via a first heat transporting means, and a second thermal path coupling the backside of the package from the reflective spatial light modulating device to a heat dissipating means via a second heat transporting means. The two paths may be controlled in an independent and/or unrelated way or the heat extracted to the first and second heat dissipating means may be controlled in combination.

The control means for controlling the heat flow in at least one of the first and second heat transporting means (or to the first and second heat dissipating means) may comprise a calculating unit and at least a first and a second temperature measuring device, each side of the at least one packaged spatial light modulator being coupled to one of the temperature measuring devices. The control means may compare the temperature from the back- and the front side with preset value and adjust the heat flow from along the first and/or the second heat transporting means or to the first and/or second heat dissipating, depending upon the difference of measured and preset value. The control means may also compare the measured temperature from backside and front side, and calculate the temperature difference. The control means may adjust the heat flow along the first and/or the second heat transporting means or to the first and/or second heat dissipating means independently of each other in case the difference in measured temperature exceeds and/or is less than a given value.

According to an aspect of the present invention, a reflective spatial light modulating device is provided, comprising a package adapted to hold a spatial light modulator, which package has a package front side for facing incident light and a package backside. The reflective spatial light modulating device further comprises a first heat transporting means being thermally coupled to the package frontside and a second heat transporting means being thermally coupled to the package backside. The first and second heat transporting means are thermally separated by the package. The reflective spatial light modulating device further comprises a control means for controlling the heat flow in at least one of the first heat transporting means and the second heat transporting means.

According to embodiments of the present invention, the control means may be suitable for controlling the heat flow in the second heat transporting means, independently of the heat flow in the first heat transporting means. According to some embodiments of the present invention, the first heat transporting means may comprise a thermally conductive frame contacting the package front side along the edge of the package front side.

According to some embodiments of the present invention, the thermally conductive frame may be provided out of highly thermally conductive material. Possibly, the thermally conductive frame may be provided out of a material from the group consisting of copper, copper alloy, aluminium and aluminium alloy. Alternatively the thermally conductive frame may be made from thermally conductive ceramic.

The thermally conductive frame may extend outside the sealed gas space, so as to evacuate heat from within the sealed gas space to a heat dissipating means or heat exchanging means located outside that sealed gas space. This may in particular be the case for single-chip configurations.

Still according to some embodiments of the present invention, the first heat transporting means may furthermore comprise at least one heat pipe, and possibly two or more heat pipes, thermally coupled to the thermally conductive frame. In this case, the thermally conductive frame may be located at least partially, or even completely within the sealed gas space, and the at least one heat pipe may then conduct heat from the thermally conductive frame to a heat dissipating means or heat exchanging means located outside that sealed gas space. According to some embodiments of the present invention, the first heat transporting means may further comprise an active cooling device, the heat pipe being coupled to the active cooling device.

According to some embodiments of the present invention, the control means may be suitable for controlling the heat flow in the second heat transporting means, independently of the heat flow in the first heat transporting means. According to some embodiments of the present invention, the second heat transporting means may further comprise an active cooling device.

In a further aspect of the present invention, a projection device is provided, comprising an optical system according to embodiments of the present invention. The projection device may be a single-chip or a multi-chip projection device, in particular a dual-chip or 3-chip projection device. It is particularly advantageous to use an optical system in accordance with embodiments of the present invention in a projection device in view of the good cooling of the spatial light modulators which can be obtained, leading to good and even enhanced image quality.

According to another aspect of the present invention, an image modulating system is provided, which image modulating system comprises an optical system and at least one reflective spatial light modulating device for being coupled to the optical system. The reflective spatial light modulating device comprises a package adapted to hold a spatial light modulator, a package front side for facing incident light and a package backside. The system further comprises a first heat transporting means and a second heat transporting means for controlling the temperature of the package front side and the backside, said second heat transporting means being thermally coupled, e.g. non-convectively, to the package backside for controlling the temperature of the package backside, said first heat transporting means being thermally coupled, e.g. non-convectively, to the package front side for controlling the temperature of the package front side. According to embodiments of the present invention, the system further may comprise a control means for controlling the heat flow in at least one of the first heat transporting means and the second heat transporting means.

According to embodiments of the present invention, the control means may be for controlling the heat flow in the second heat transporting means, independently of the heat flow in the first heat transporting means. According to some embodiments of the present invention, the control means may be suitable for controlling the heat flow in the first heat transporting means, independently of the heat flow in the second heat transporting means.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved image modulating systems, part of optical systems, which image modulating systems are more resistant to air pollution, e.g. due to the presence of stage or tobacco smoke, frequently causing the optical part of the image modulating system to be contaminated by oil particles being present in such stage smoke. More in general, it permits image modulating systems, and thus the optical systems, to function longer without the need of a maintenance intervention. It also permits the provision of image modulating systems in which the reflective spatial light modulating device can be provided in airtight contact with the prismatic light splitting/combining unit, while still allowing efficient cooling of the reflective spatial light modulating device.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The following terms are provided solely to aid in the understanding of the invention. These definitions should not be construed to have a scope less than understood by a person of ordinary skill in the art.

The term "housing for a spatial light modulating device" is to be understood as an assembly for modulating incident light according to digital image information, especially arbitrary digital image information. The housing may include fittings for mounting a light modulator mounted into a package. The package has a front side for facing the incident light, which front side may be provided with a transparent wall such as a glass wall, and a package backside which may comprise electronic components or a connection to electronic components for driving the spatial light modulating device. Two or more heat transporting elements may be provided for cooling the assembly. The assembly may optionally comprise a chemical filter for absorbing e.g. silicon oils or contaminating elements in the space between light modulator and glass wall of the front side.

The term "package" is to be understood as a preassembled unit.

The term "package front side" is to be understood as the side of the package of the spatial light modulating housing which is facing the incident light. This side is also emitting projection light towards the projection optics.

The term "reflective spatial light modulator" is to be understood as a spatial light modulator which modulates the light in reflective mode, e.g. using an addressable mirror, a series of mirrors as is found in the form of a rotating polygon or an array of individually addressable mirrors, more particular, mirroring elements being part of the light modulator mounted in the package of the housing.

A reflective spatial light modulating device may comprise different types of reflective light modulators, such as digital mirror device (DMD), a liquid crystal display (LCD) or a liquid crystal on silicon (LCOS). Preferably, the light modulators can be addressed on a pixel-by-pixel basis to thereby represent an arbitrary image of varying greyscale, e.g. video images. The DMD, also called digital mirror device or digital micromirror device, is a reflective spatial light modulator, comprising a semiconductor-based array of fast, reflective digital light switches that precisely control reflection of a light source using, for example, a binary pulse width modulation technique. A DMD has a matrix of a plurality of individually addressable and electrically deformable or moveable mirror cells. In a first state or position, each mirror cell of the digital mirror device acts as a plane mirror to reflect the light received to one direction, through a projection lens towards e.g. a projection screen, while in a second state or position they project the light received to another direction, away from the projection screen. In a reflective liquid crystal display (LCD) light valve, the light is not modulated by a mechanical displacement of a mirror, but by changing the polarization state of the liquid crystals in the light valve.

The term "passive cooling device" is to be understood as a device whose thermal energy taken from the object to be cooled, cannot be controlled by means of a controlling unit, i.e. it dissipates heat in an open loop manner.

The term "active cooling device" is to be understood as a device whose thermal energy taken from the object to be cooled, can be controlled by means of a controlling unit. As an example, an active cooling device may be a Peltier element. Any form of microcooling device can be used. For example one type of cooling devices are micro-electro-mechanical refrigeration systems. One example of such a system may be a refrigeration system based on a magnetic refrigeration cycle whereby a micro-electro-mechanical switch, a micro relay, a reed switch or a gate switch may be used for switching between an absorption phase and a heat rejection phase of such a cycle. Such devices are described in more detail in e.g. U.S. Pat. No. 6,588,215 B1 from International Business Machines Corporation. Another example of such a system may be a thermoacoustic refrigerator based on providing a temperature difference across a stack using a piezoelectric driver. Thereby a high frequency sound is generated which, by interaction with one or more parts of the stack creates a temperature gradient, thus allowing cooling, as e.g. described in more detail in U.S. Pat. No. 6,804,967 B2 by University of Utah. Still another example of such a system may be a micro-electro-mechanical system whereby expansion of gas is controlled using a micro-electro-mechanical valve, as described in more detail in U.S. Pat. No. 6,804,967 by Technology Applications, Inc. It is an advantage of several of these cooling means that they can be applied using micro-electro-mechanical technology, lithography or thin film deposition techniques such that integration in the detection system can be performed and that their size is compact.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Other arrangements for accomplishing the objectives of a reflective spatial light modulating housing, embodying the invention will be obvious for those skilled in the art.

One or more optical systems 100 comprising a packaged reflective spatial light modulating device (SLM) in accordance with embodiments of the present invention may be used in a projection system. In a single-chip projection system, a single reflective spatial light modulating device 111, e.g. DMD or reflective LCD, is provided, e.g. for a monochromatic projector. However, a single chip projection system may be provided together with means such as e.g. a colour wheel, for providing time-sequential colour break-up of images to be projected. The different colour images are projected so fast one after the other that the eye of a user watching the projected images, due to its slowliness, integrates the separately projected colour images and perceives a single multi-colour image. In a dual-chip projection system, an optical system comprising two reflective spatial light modulating devices 111 may be provided. Such dual-chip projection system may for example be used for stereoscopic imaging, i.e. each of the reflective spatial light modulating devices 111 may cooperate with means such as e.g. a colour wheel or a sliding filter for providing time-sequential colour break-up of images to be projected, and each of the reflective spatial light modulating devices 111 may provide images for a different eye of a user watching the projected images, e.g. a first SLM 111 may provide images for a left eye and a second SLM 111 may provide images for a right eye of the user. For best light output and in order to obtain saturated colours, it is best to use a 3-chip system, i.e. a projection system comprising 3 SLM's 111, each SLM being in the light path of a basic colour and providing part of an image to be projected corresponding to that basic colour, e.g. one SLM for red, one for green and one for blue light. In principle, also a multi-chip system comprising more than 3 SLM's can be envisaged, wherein light, for example white light, is split up in more than the 3 basic colours, and each SLM provides part of an image to be projected corresponding to the respective colour. The differently coloured images are combined so as to form a coloured projected image.

Figure 5:
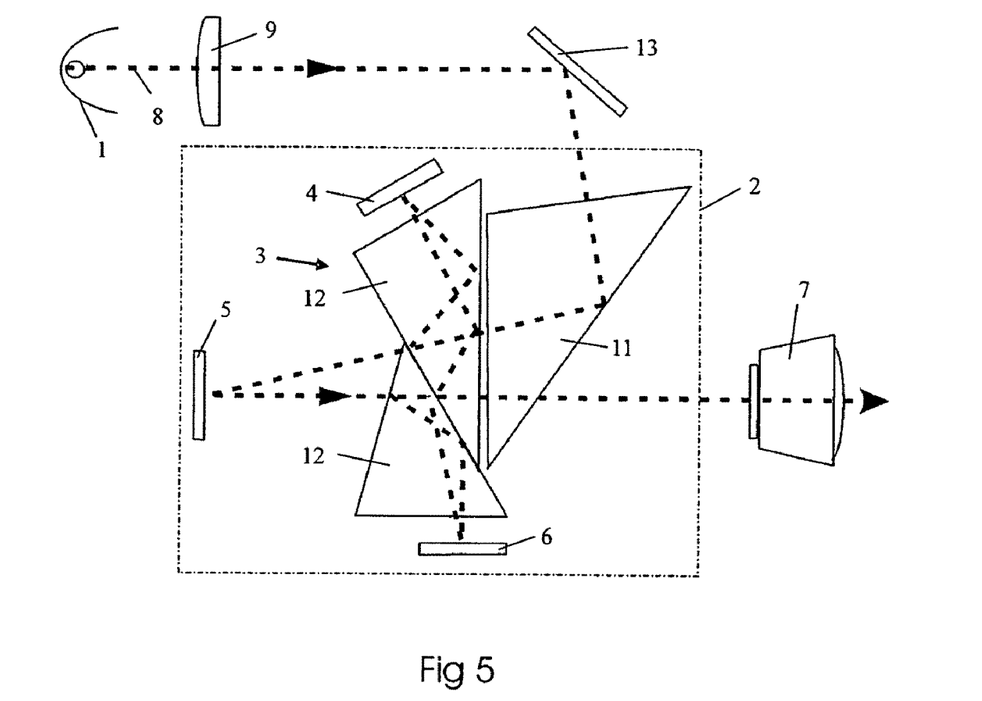
FIG. 5 is a schematic view of the main parts of a projection device provided with an optical system comprising three reflective spatial light modulating devices in accordance with an embodiment of the present invention.

FIG. 5 is a schematic view of the main parts of a projector apparatus provided with 3 reflective SLM's in accordance with an embodiment of the present invention. The projector apparatus comprises a white light source 1, an optical unit 2 comprising a light colour component splitting/combining device, e.g. a prismatic unit 3 comprising one or more prisms, and a plurality of reflective SLM's, e.g. DMDs 4, 5, 6 (each controlling one colour to be projected by the projector apparatus on a display screen—DMD 4 for blue, DMD 5 for green and DMD 6 for red), and a projection lens 7. The prismatic unit 3 in the optical unit 2 may comprise a total internal reflection (TIR) prism 11 and colour-splitting/colour-combining prisms 12. Because a DMD is an array of reflective light switches, no light absorbing polarisers are required. From FIG. 5 it can be seen that the DMDs 4, 5, 6 are mounted at the exit sides of the prismatic unit 3 with respect to the light from source 1.

Light 8 from the light source 1, for example, a metal halide or xenon lamp, is collected by a condenser lens 9 for obtaining a uniform illumination. For proper operation of the DMD spatial light modulator, this light is preferably directed at about 20 degrees relative to the normal of the DMD chip. To accomplish this in a method that eliminates mechanical interference between the illuminating and projecting optics, a mirror 13 and a total internal reflection prism 11 are interposed between the projection lens 7 and the DMD colour-splitting/colour-combining prisms 12.

The colour-splitting/colour-combining prisms 12 may have dichroic interference filters deposited on their surfaces to split the light by reflection and transmission into a plurality of colour components, e.g. red, green and blue components. With this type of red and blue light generating prisms, an additional reflection from a TIR surface of the prism is required in order to direct the light at the correct angle to the red and blue DMDs. Light reflected from the on-state mirrors of the three DMDs is directed back through the prisms and the colour components are combined. The combined light then passes through the TIR prism and into the projection lens 7 because its angle has been reduced below the critical angle for total internal reflection in the prism air gap.

Figure 1:
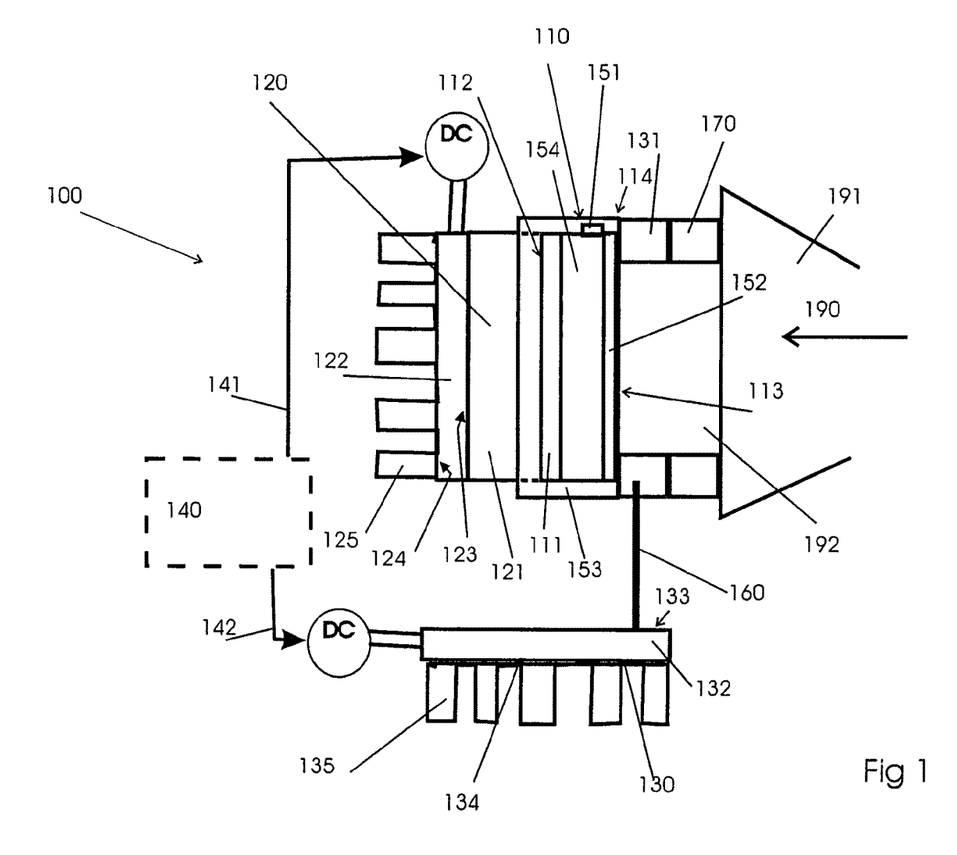
FIG. 1 is schematic representation of an optical system comprising a reflective spatial light modulating device as subject of embodiments of the present invention.

According to embodiments of the present invention, each of the packaged spatial light modulators, e.g. DMD's 4, 5, 6 encloses a sealed gas space in between their front side and the prismatic unit 3, as represented in FIG. 1. With "substantially sealed" is meant that it is sealed from the ambient air so that no significant quantities of dust or smoke particles can enter the chamber, but there is not necessarily any difference in pressure between the internal space of the sealed chamber and the ambient air. The substantially sealed chamber can be an atmospheric system that it is not necessarily pressure sealed and may be filled with a gas such as air. Incoming white light is split into its colour components in the prismatic unit 3 and the colour components are modulated at the SLM's to project an image towards a projection screen. The sealed chamber can have a gas filling such as air that is wind-still, i.e. no active convective air circulation such as a fan or blower. As DMDs 4, 5, 6 are heat sensitive, and hot spots on the prismatic unit 3 can cause discoloration of the projected image, the DMD's 4, 5, 6 are cooled in accordance with embodiments of the present invention. In embodiments of the present invention, the DMD's are cooled separately from the cooling for the prismatic unit 3. The prismatic unit may be cooled by forced convection provided by means of an air stream blown over the prismatic unit by means of a fan.

A schematical view of a first embodiment of an optical system 100 according to embodiments of the present invention, comprising a packaged reflective spatial light modulating device 111 is shown in FIG. 1. The reflective spatial light modulating device 111 is contained in a package 110 adapted to hold the spatial light modulator 111. In a multi-chip configuration, a plurality of such packaged reflective spatial light modulating devices 111 are provided.

The package 110 has a package front side 113 for facing incident light 190 and a package backside 112. The optical system 100 further comprises a first heat transporting means 130 being thermally coupled to the package frontside 113 and a second heat transporting means 120 being thermally coupled to the package backside 112, the first and second heat transporting means being thermally separated by the package 110. The optical system 100 illustrated further comprises a control means 140 for controlling the heat flow in the first heat transporting means 130 and for controlling the heat flow in the second heat transporting means 120 either independently from the heat flow in the first heat transporting means 130 or in combination. According to embodiments of the present invention, the cooling of the front side 113 of the package 110 and the cooling of the backside 112 of the package 110 may be performed independently from each other, and any or both may be controlled cooling. Also the control of the cooling of each SLM is independent of the control of any of the others.

The package 110 comprises a reflective spatial light modulator 111 which in particular embodiments may be a DMD or a reflective LCD. The package 110 further comprises a casing 153 in which a chemical filter 151 can be provided. The casing 153 together with a transparent and solid, e.g. glass, window 152 creates an airtight volume 154 at the front side of the reflective light modulator 111. The airtight volume 154 is windstill, i.e. non-turbulent, as no fan or other means are provided for moving air inside the airtight volume 154. Heat generated by the reflective light modulator 111 will travel by convection through the airtight volume 154, and will come out of the package 110 by conduction through the wall thereof. This heat, in accordance with embodiments of the present invention, is removed via the first heat transporting means 130.

In use, incident light 190 is incident on the matrix of reflective light modulator pixels, e.g. mirrors, of the modulator 111 via the glass window 152 and the volume 154. The matrix of reflective light modulator pixels, e.g. mirrors, which are driven by image information provided to electronic elements (not illustrated) present at the back side of the modulator 111, reflect the light in two different directions, one through the transparent window 152 towards an optical system 191 for projection and one away therefrom, e.g.; to a black heat sink (not illustrated).

The first heat transporting means 130 comprises a thermally conductive frame 131, which is to contact the front side 113 of the package 110. The thermally conductive frame 130 contacts the package front side 113 along the edge 114 of the package front side 113. A thermally conductive frame 131 may be provided out of thermally conductive material, preferably having a thermal conductivity of more than 80 W/m*K, measured at ambient temperature being 20° C., or more preferred out of highly thermally conductive material having a thermal conductivity of more than 150 W/m*K at ambient temperature. As an example, the frame 131 may be provided from a metal or a metallic substance e.g. Copper, Copper alloy, Aluminium or Aluminium alloys. Alternatively, thermally conductive ceramics may be used. The frame may have a thickness of about 2.5 to 8 mm such as 3.7 mm.

Via the thermally conductive frame 131, the front side 113 of the package 110 is thermally coupled over a solid material to a passive cooling device or to an active, i.e. controllable cooling device 132, by means of a second heat transporting means. In particular embodiments, the first heat transporting means, in particular of a controllable cooling device 132, is a non-convective heat transporting means, e.g. a conductive heat transporting means. In alternative embodiments, it may include a non-turbulent convective thermal contact. The first heat transporting means can be at least one heat pipe 160. As an example, a simple array of cooling fins can be used as a passive cooling device 132. As an example, a Peltier element can be used as an active cooling device 132, whose cold side 133 is coupled to the first heat transporting means, e.g. the at least one heat pipe 160, whereas its warm side 134 is thermally coupled to a heat dissipating means, e.g. air-cooled cooling fins 135 or a liquid cooled heatsink. Accordingly, a first thermal path for the first heat transporting means 130 is provided. An alternative active cooling device is an air-cooled heat sink, e.g. an array of cooling fins, to which the amount of cooling air is controllable by controlling the rotation speed of an air fan. In embodiments of the present invention, a separate air fan can be provided for each of the first heat transporting means. Another alternative active cooling device is a water- or liquid-cooled heat sink, to which the amount of cooling liquid is controllable by controlling the output of a liquid pump coupled to this liquid cooled heat sink. As an example, the cooling liquid can be a mixture of glycol and demineralised water.

The first heat transporting means used, e.g. heat pipes 160, allow transport or evacuation of heat or thermal energy out of cramped and shallow spaces, e.g. the space between SLM, e.g. DMD and the front of the glass assembly or projection optics. The heat pipes, having in particular embodiments a diameter of less than 2.5 mm, such as 2 mm, are able to transport a given amount of thermal energy by means of a small temperature difference over the outer ends of the heat pipe. The thermal conductive performance of the heat pipe is to be defined and dimensioned using the "worst case-" orientation of the heat pipe, as for most heat pipes, the thermal conductive performance is dependent on the orientation of the heat pipes. In particular embodiments, omnidirectional heat pipes may be used, which do not, or to a lesser extent, show this directional dependency.

The second heat transporting means 120 comprises any suitable means for conducting away heat, e.g. a thermally conductive stud 121, which is to contact the backside 112 of the package 110. Thermal coupling means (not shown in FIG. 1) are provided to thermally couple the backside 112 to the stud 121, and possibly electrical insulation means (not illustrated) are provided to electrically insulate the electronic element at the backside of the modulator 111, which may be present on the backside 112 of the package 110, from the stud 121. The thermal coupling means may at the same time form the electrical insulation means, and may for example be a thermally conductive but electrically insulating glue. The stud 121 is preferably made from a highly conductive material such as a metal. The stud 121 thermally couples the backside 112 of the package 111 with a passive or an active, i.e. controllable, cooling device 122. As an example, a simple array of air cooling fins can be used as a passive heat sink. A Peltier element can be used as an active cooling device 122, whose cold side 123 is coupled to the stud, whereas its warm side 124 is thermally coupled to a heat dissipating means, e.g. air-cooled cooling fins 125 or a liquid cooled heatsink. In either case, a second thermal path of the second heat transporting means 120 is provided. An alternative active cooling device is an air-cooled heat sink, e.g. an array of cooling fins, to which the amount of cooling air is controllable by controlling the rotation speed of an air fan. Another alternative active cooling device is a water- or liquid-cooled heat sink, to which the amount of cooling liquid is controllable by controlling the output of a liquid pump coupled to this liquid cooled heat sink. As an example, the cooling liquid can be a mixture of glycol and demineralised water.

The thermal path of the second heat transporting means 120 is not necessarily coupled to, i.e. could be independent from the thermal path of the first heat transporting means 130. It is understood that the heat dissipating means 125 and 135 may be part of one larger heat dissipating means, still having two mutually independent thermal paths, although two mutually separated heat dissipating means 135 and 125 are preferred. The heat dissipating means 125, 135 may include some form of heat exchangers in which heat is converted from heat transferred by one material to heat transferred by another material, e.g. conductive heat in a metal to convective heat transferred by a gas or a liquid.

At least one of the cooling devices 122, 132 may be an active cooling device, i.e. controllable. However, it is not necessary for both cooling devices to be controllable.

As shown schematically in FIG. 1, a sealing 170, e.g. a silicone rubber seal, may be provided between the thermally conductive frame 131 and the projection optics 191, thereby coupling in an airtight way the reflective spatial light modulating device 100 to the projection optics 191. The projection optics 191 may comprise standard components such as e.g., but not limited thereto, a prismatic light splitting/combining unit, prisms, mirrors, dichroic filters. In accordance with embodiments of the present invention, and as illustrated in FIG. 1, a substantially sealed chamber 192 is provided between the package 110 and the projection optics 191. The term "substantially sealed" is to be understood as being sealed from the ambient air so that no significant amounts of dust or smoke particles can enter the chamber 192. The substantially sealed chamber 192 is free of optical components. The substantially sealed chamber 192 is windstill, i.e. non-turbulent, as no fan or other means are provided for moving air inside the substantially sealed chamber 192. Heat generated by the reflective light modulator 111 and coming out of the package 110 at the front side is removed by a frame of a first heat transporting means 130 thermally coupled to the front side of the package 110. The heat may be transported away from the substantially sealed chamber 192 up to a heat exchanger where the temperature is further brought down.

In case of a plurality of light modulators 111 being present in e.g. a projection system, each light modulator 111 may have an individual sealed chamber 192 between the package 110 of that SLM 111 and the optical system 191. Cooling of the front side of the packages 110 in the sealed chamber 192 is performed by contact with the solid material of the first cooling device 130. This may be done, in accordance with embodiments of the present invention, for each of the plurality of light modulators 111 separately.

Turning to the control means 140, in the embodiment as shown schematically in FIG. 1, the control means 140 can control the heat flux or heat flow in the second heat transporting means 120. This control can be done, for example, by controlling the DC-current 141 flowing to a Peltier element 122. In conjunction with or independently from the heat flux or heat flow in the second heat transporting means 120, the control means 140 can control the heat flux or heat flow in the first heat transporting means 130, e.g. by controlling the DC-current 142 flowing to the Peltier element 132.

As an example, the heat conductive frame 131 at the front side 113 of the DMD package 110, and the stud 121 at the backside 112 of the package may be provided with temperature sensors providing an analog electrical signal being dependent of the temperature measured. The temperature dependent signals of the front and backside may be used to control the amount of thermal energy flowing from front side and backside through the heat transporting means, e.g. by using the signal to control the active cooling devices by controlling the DC-currents 141 and 142 flowing to Peltier elements of the cooling devices 122 and 132. The controlling can take into account the absolute temperatures measured at front side and backside, as well as the difference in temperatures between front side and backside. This information can be deduced by interpretation of the temperature signals of the temperature sensors. The analog signals may be transformed into digital information by means of an A/D converter.

The overall temperature of the package 110, and more in particular of the modulator 111, may be adjusted, i.e. increased or decreased, by simultaneously increasing or decreasing the heat flow in both the first and the second heat transporting means 120, 130. As an example, a preset value, e.g. of about 69° C. can be envisaged. In case the temperature of either front side of backside tends to differ too much, i.e. more than a pre-set threshold value, from this preset value, e.g. more than 2° C., the amount of heat flow from the side having a temperature exceeding this preset value, taking into account the pre-set threshold value, can be increased.

If for any reason whatsoever, the difference in temperature measured between the front side and the backside of the package becomes too high, e.g. exceeding 10° C., the heat flux may be increased by adjusting the heat flux of only one of the two heat transporting means, for example only the heat flux from the warmest of both sides. Alternatively, the heat flux from the coldest of both sides may be decreased by adjusting the heat flux of only one of the two heat transporting means. As still an other alternative, the control means may adjust the heat flux of both heat transporting means in an appropriate way to bring the measured temperatures back closer to each other. The control of the temperature difference between front side and back side may be important if chemical filters, such as filter 151 in FIG. 1, are present between the glass plate and the matrix of mirrors inside the reflective spatial light modulating package. In case the temperature drop over this chemical filter is too high, preferably not higher than 10° C., the chemical filter can loose its properties, causing the trapped dirt and/or oil and/or other contaminants to leak again into the space between glass window and mirrors. This may cause malfunctioning of the spatial light modulating package.

The use of a heat pipe, or preferably more than one heat pipe such as two heat pipes, has the advantage that these heat pipes can conduct very efficiently a heat flux from one end of the heat pipe to the other, meanwhile not requiring much space to be mounted. One end of the at least one heat pipe may be provided inside the sealed chamber 192, while the other end may be provided outside the sealed chamber 192. The heat pipes can easily be bent according to the outer dimensions of the package, and require no or no significant modification to existing light engine setups. They can easily be fit into the small gaps which are present in the presently known light engines, so the heat flux of the first heat transporting means can easily be transferred to a heat dissipation means and possibly an active cooling device, which are mounted outside the optical zone of the light engine.

Figure 2:
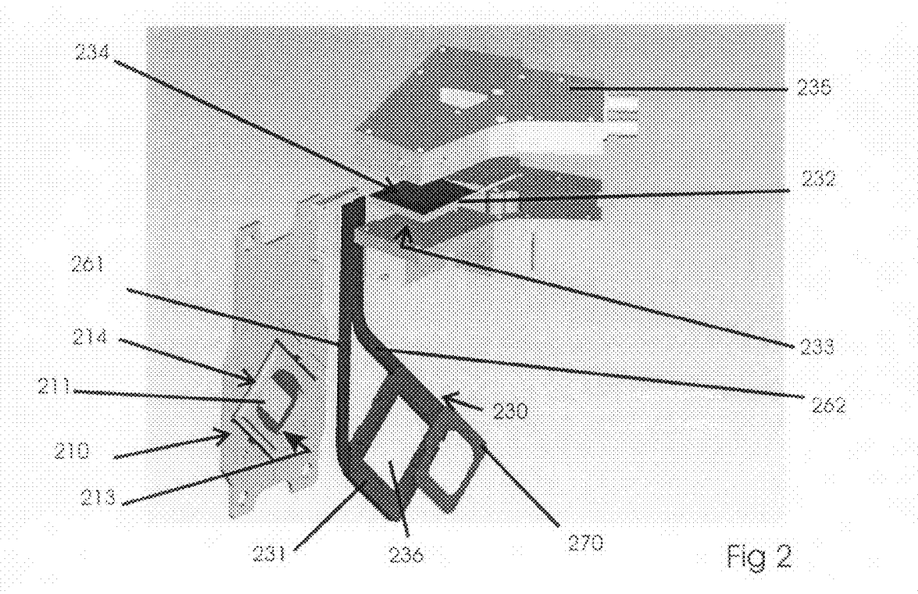
FIG. 2 shows schematically the elements of the first heat transporting means and the package of a reflective spatial light modulating device in accordance with an embodiment of the present invention.
Figure 3:
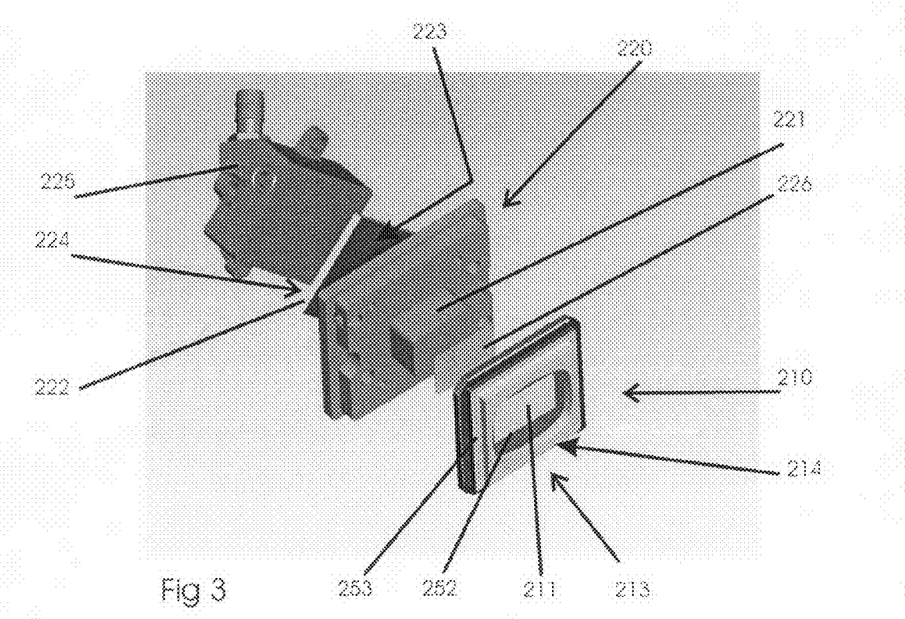
FIG. 3 is a schematic view of the elements of the second heat transporting means and the package of a reflective spatial light modulating device as in FIG. 2, in accordance with an embodiment of the present invention.
Figure 4:
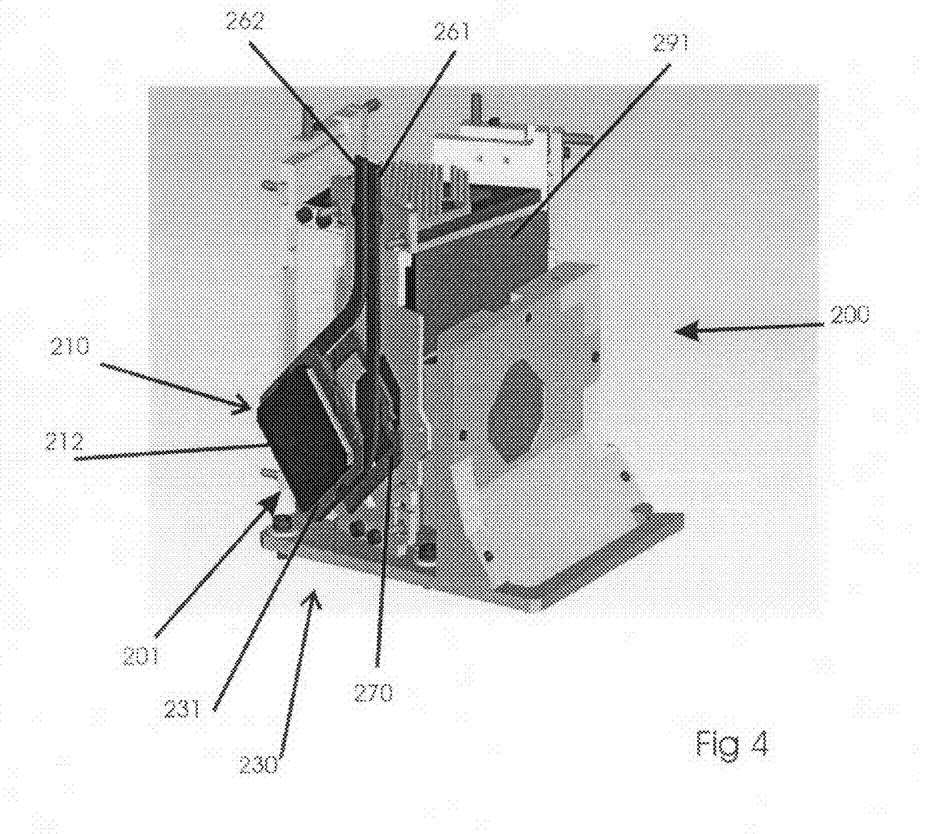
FIG. 4 shows a part of a light engine or image modulating system, onto which only the first heat transporting means of the reflective spatial light modulating device of FIG. 2 is mounted.

A setup of a light engine or image modulating system 200 as an embodiment of the present invention is illustrated in FIG. 4, and comprises a reflective spatial light modulating device 211, and a heat transporting system illustrated in more detail in FIG. 2. The other heat transporting system illustrated in more detail in FIG. 3 is not shown in FIG. 4 for ease of illustration. The same reference numbers refer to the same or analogous features.

FIG. 2 schematically shows the elements of the first heat transporting means 230 and the package 210. FIG. 3 schematically shows the elements of the second heat transporting means 220 and the package 210. FIG. 4 shows a part of a light engine, onto which the elements of the second heat transporting means 230 and the package 210 are mounted.

As shown in FIG. 2, the front side 213 of the package 210 is brought into contact with a heat conducting frame 231, made out of highly thermally conductive material such as a metal or metallic substance such as copper, all along the outer edge 214 of the front side 213. As shown in FIG. 2, the frame 231 has an aperture 236 for allowing incident light to fall on the light modulator 211. To the frame 231, heat transporting means, e.g. two ends of two heat pipes 261 and 262 are connected. The opposite ends of the heat pipes 261, 262 are coupled to a cooling device, e.g. to the cold side 233 of a Peltier element 232. The warm side 234 of the Peltier element 232 is contacting a second liquid cooled heat sink, being the heat dissipating means 235.

In FIG. 3, the package 210 is shown comprising a reflective spatial light modulator, e.g. DMD light modulator 211, held in a casing 253. The casing 253 is closed at its front side 213 by means of a transparent window, e.g. glass window 252. At the backside 212 of the package 210 (not visible in FIG. 3, but illustrated in FIG. 4), a second heat transporting means 220 is provided, comprising the thermally conductive, e.g. metal, stud 221, which is coupled to the backside of the spatial light modulator 211 via thermal interface material 226, which interface material 226 is thermally conductive and possibly electrically insulating. The stud 221 is connected to a cooling device, e.g. to a cold side 223 of a Peltier element 222. The warm side 224 of the Peltier element is brought into contact with a heat dissipating means 225, in this case a liquid cooled heat sink.

FIG. 4 shows in more detail how at the front side of image modulating system 200, a seal 270 is provided between the front side of the first heat transporting means 230 of the reflective spatial light modulating device 200 and the optical system 291, comprising a.o. the prism. The elements of the second heat transporting means 220 are not shown in FIG. 4 in order not to obscure underlying elements, but it is clear that these parts are to be coupled to the backside 212 of the package 210, as shown in FIG. 3.

It is to be understood that although preferred embodiments, specific constructions and configurations, as well as materials, have been discussed herein for devices according to the present invention, various changes or modifications in form and detail may be made without departing from the scope and spirit of this invention. For example, the image modulating system comprising reflective spatial light modulating device as subject of the present invention may be a single-chip image modulating system comprising one reflective spatial light modulating device.

Figure 6:
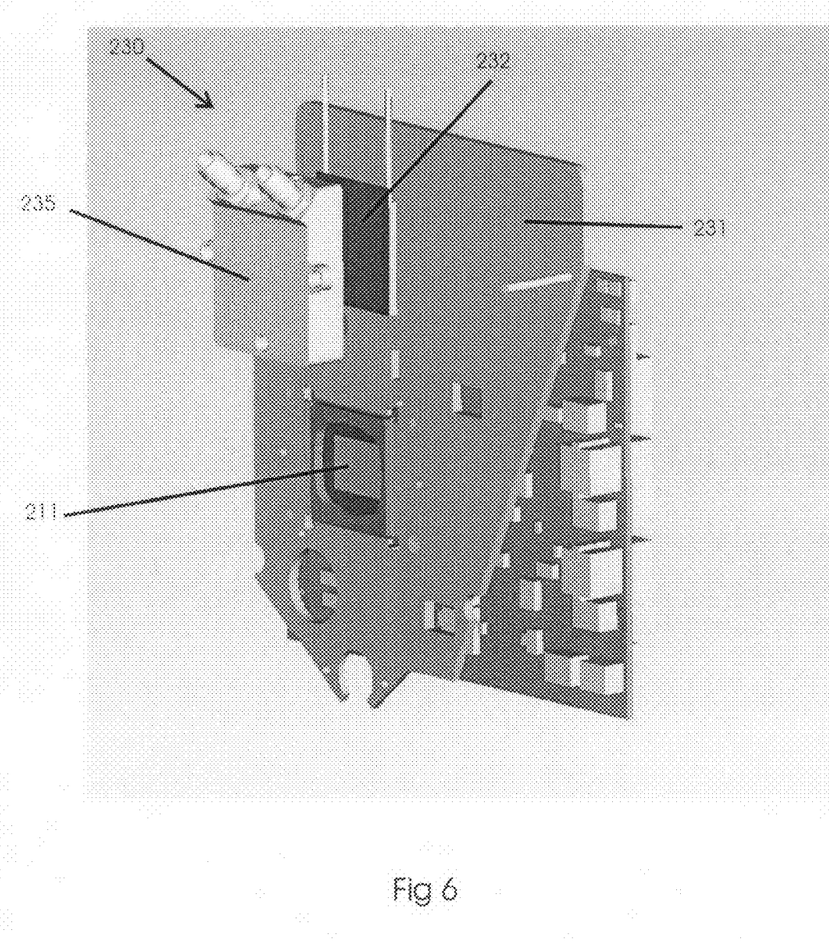
FIG. 6 is a schematic view of the first heat transporting means of a single-chip configuration in accordance with embodiments of the present invention.

FIG. 6 illustrates the case of a single chip system, comprising an SLM 211 and first heat transporting means 230. In the case illustrated, the first heat transporting means comprises a rigid heat conductive frame 231 made from highly thermally conductive material. This heat conductive frame 231 transports heat from within the sealed chamber (not illustrated in FIG. 6) to a location away from the sealed chamber, where heat exchange can take place, e.g. by means of a Peltier element 232 and a heat dissipating means 235.

In alternative embodiments, the optical system comprising a reflective spatial light modulating device as subject of the present invention may be a dual-chip system comprising two reflective spatial light modulating devices. This may in particular be the case for example for a field sequential stereoscopic projection system with one SLM for providing images for a first, e.g. left, eye, and a second SLM for providing images for a second, e.g. right, eye, and provided with colour wheels for time-sequentially providing the colour aspects of each of the images.

In yet alternative embodiments, the optical system comprising a reflective spatial light modulating device as subject of the present invention may be a color or 3-chip image modulating system comprising three reflective spatial light modulating housings cooperating to create an image. In the case of 2-chip or a 3-chip image modulating system, it is understood that the control means to control the heat flow through the two or three pairs of heat transporting means, one for each package, can be one and the same control unit, or the system may comprise two or three separately functioning control means. In particular embodiments of the present invention, in case two or more spatial light modulators are present, each of the spatial light modulators may be provided with a cooling system for the front and for the back, the cooling systems for front and back for each individual spatial light modulator operating independently from each other, and the cooling systems for front and back of one spatial light modulator moreover operating independently from the cooling systems for front and back of another spatial light modulator.

The invention claimed is:

1. An optical system comprising at least one packaged spatial light modulator comprising a front side for facing incident light, projection optics for projecting an image formed by the packaged spatial light modulator, a sealed gas space in between the front side of the packaged spatial light modulator and the projection optics, and first heat transporting means being thermally coupled to the front side of the spatial light modulator, the first heat transporting means comprising a thermally conductive frame contacting the front side of the packaged spatial light modulator along an edge thereof.

2. An optical system according to claim 1, the at least one packaged spatial light modulator comprising a back side, the optical system furthermore comprising a second heat transporting means thermally coupled to the back side of the at least one packaged spatial light modulator.

3. An optical system according to claim 2, wherein the first and second heat transporting system are thermally separated from each other by the packaged spatial light modulator.

4. An optical system according to claim 2, wherein second heat transporting means further comprises an active cooling device.

5. An optical system according claim 1, furthermore comprising a control means for controlling the heat flow in at least one of the first heat transporting means and the second heat transporting means.

6. An optical system according to claim 5, wherein a control means is for controlling the heat flow in the second heat transporting means, independently of the heat flow in the first heat transporting means.

7. An optical system according to claim 5, wherein the control means is suitable for controlling the heat flow in the first heat transporting means, independently of the heat flow in the second heat transporting means.

8. An optical system according to claim 5, comprising at least two packaged spatial light modulators, wherein the control means for controlling the heat flow in at least one of the first heat transporting means and the second heat transporting means is adapted for controlling one of the first of second heat transporting means independently from any other of the first or second heat transporting means.

9. An optical system according to claim 1, wherein the first heat transporting means furthermore comprises at least one heat pipe, thermally coupled to the thermally conductive frame.

10. An optical system according to claim 9, wherein the first heat transporting means further comprises an active cooling device, said heat pipe being coupled to the active cooling device.

11. An optical system according to claim 1, wherein said thermally conductive frame is provided out of highly thermally conductive material such as a metal.

12. An optical system according to claim 1, wherein said thermally conductive frame is provided out of a material from the group consisting of copper, copper alloy, aluminium, aluminium alloy and thermally conductive ceramic.

13. An projection device comprising an optical system according to claim 1.

* * * * *